United States Patent
Lin

(10) Patent No.: US 8,161,629 B2
(45) Date of Patent: Apr. 24, 2012

(54) BACKLIGHT MODULE ASSEMBLING APPARATUS

(75) Inventor: I-Thun Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/913,783

(22) Filed: Oct. 28, 2010

(65) Prior Publication Data

US 2011/0265317 A1 Nov. 3, 2011

(30) Foreign Application Priority Data

Apr. 28, 2010 (TW) ................................ 99113583 A

(51) Int. Cl.
*B23P 19/00* (2006.01)
(52) U.S. Cl. ................ 29/729; 29/741; 29/758; 362/634
(58) Field of Classification Search ................... 29/278, 29/626, 729, 739, 741, 758, 762–764; 362/97.1, 362/632–634; 81/53.1, 52
See application file for complete search history.

(56) References Cited

U.S. PATENT DOCUMENTS

| | | | | |
|---|---|---|---|---|
| 4,521,959 A * | 6/1985 | Sprenkle | ......................... | 29/741 |
| 5,446,960 A * | 9/1995 | Isaacs et al. | ..................... | 29/834 |
| 6,032,554 A * | 3/2000 | Durant | .............................. | 81/8.1 |
| 6,401,571 B1 * | 6/2002 | Schuman | ....................... | 81/53.1 |
| 7,762,708 B2 * | 7/2010 | Lee et al. | ....................... | 362/632 |
| 7,771,106 B2 * | 8/2010 | Yang et al. | ..................... | 362/634 |
| 2011/0265317 A1 * | 11/2011 | Lin | ................................ | 29/729 |

\* cited by examiner

*Primary Examiner* — Minh Trinh
(74) *Attorney, Agent, or Firm* — Altis Law Group, Inc.

(57) ABSTRACT

A backlight module assembling apparatus for attaching a reflector plate to a driving circuit board is disclosed. The backlight module assembling apparatus includes an assembling portion and a pressing movably connected to the assembling portion. The assembling portion defines a receiving space configured for receiving and positioning a driving circuit board therein. The assembling portion includes a top plate and a first opening defined in the top plate. The first opening communicates with the receiving space. The assembling portion includes a number of blades arranged around the first opening for cutting a reflector plate. The pressing portion includes a pressing plate. The pressing plate is movable toward and away from the blade and configured for pressing the reflector plate against the blades thus allowing the blades cutting the reflector plate to a shape conforming to the first opening and attaching the reflector plate to the driving circuit board.

11 Claims, 3 Drawing Sheets

BACKLIGHT MODULE ASSEMBLING APPARATUS

BACKGROUND

1. Technical Field

The present disclosure relates to a backlight module assembling apparatus.

2. Description of Related Art

Many devices are provided with backlight modules, such as keypads and display screens. A backlight module typically includes a driving circuit board, a light guide plate placed on the driving circuit board, a reflecting plate located between the light guide plate and the driving circuit board, and a light source. Light emitted from the light source is reflected and guided to exit from a predetermined surface of the light guide plate.

In assembly, firstly, the reflector may be adhered on the driving circuit board, and then, the light guide plate is placed on the driving circuit board and covers the reflector. The reflector is usually structured as a thin film for reducing the size of the backlight module. Two opposite surfaces of the reflector are coated with adhesive. The reflector is connected to both the driving circuit board and the light guide plate by the adhesive. Because the reflector is a thin film, when the reflector is adhered to the driving circuit board, the reflector is difficult to position precisely, resulting in brightness and light uniformity of the backlight module being reduced. Therefore, a lot of time and manpower is consumed to ensure the precision of the positioning of the reflector and the flatness of the surface of the reflector, and so the assembling efficiency of the backlight module is relatively low.

What is needed therefore, is a backlight module assembling apparatus addressing the above-mentioned problems.

BRIEF DESCRIPTION OF THE DRAWINGS

The components of the drawings are not necessarily drawn to scale, the emphasis instead being placed upon clearly illustrating the principles of the embodiments of the backlight module assembling apparatus. Moreover, in the drawings, like reference numerals designate corresponding parts throughout several views.

DETAILED DESCRIPTION

Figure 1:
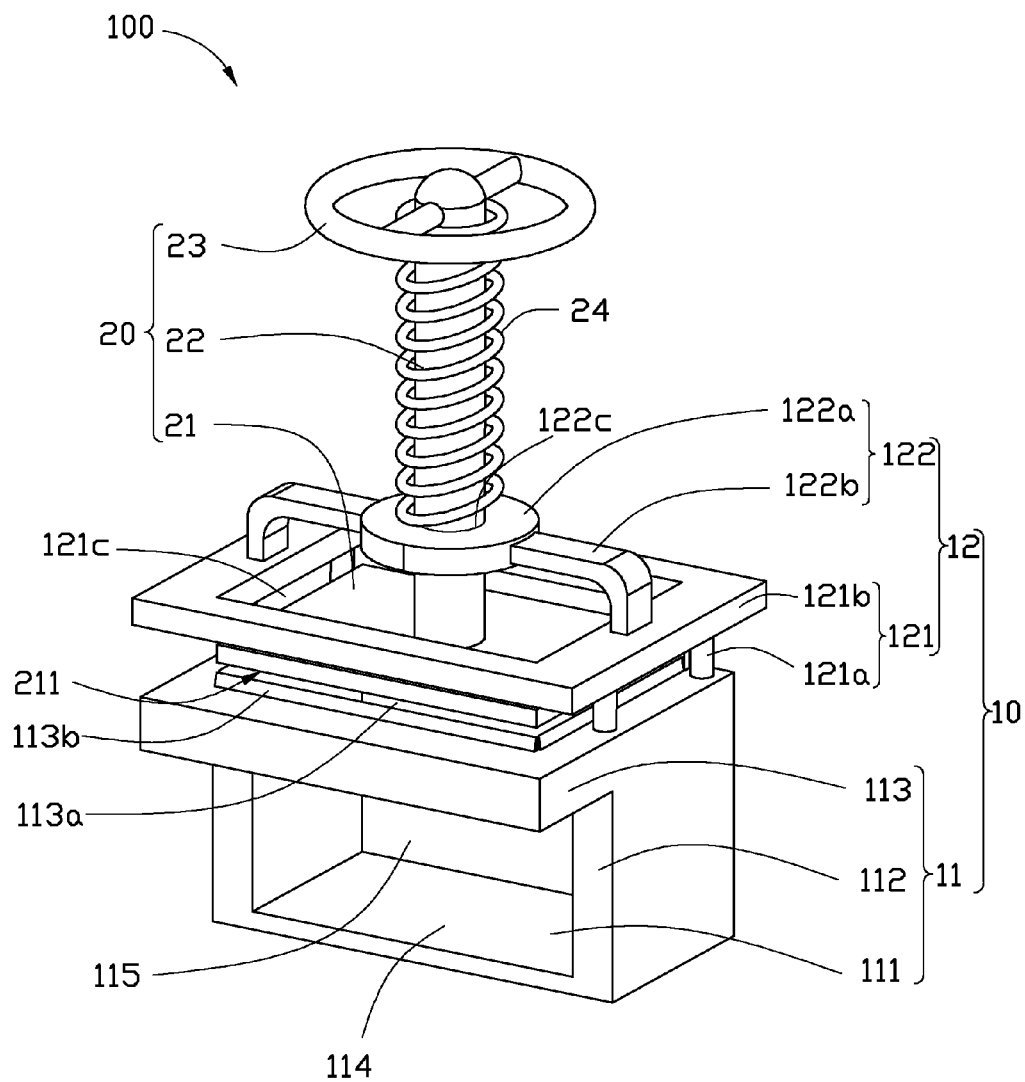
FIG. 1 is an isometric view of a backlight module assembling apparatus according to an exemplary embodiment of the present disclosure.

Referring to FIG. 1, a backlight module assembling apparatus 100, according to an exemplary embodiment, is shown. The backlight module assembling apparatus 100 includes an assembling portion 10 and a pressing portion 20 slidably connected to the assembling portion 10.

The assembling portion 10 includes an assembling base 11 and a connecting unit 12 connected together. The assembling base 11 includes a bottom plate 111, two side plates 112, and a top plate 113. The bottom plate 111 and the top plate 113 are substantially parallel to each other, and the side plates 112 are perpendicularly connected to the bottom plate 111 and the top plate 113. The bottom plate 111, the side plates 112, and the top plate 113 cooperatively define a receiving space 114 therebetween. The receiving space 114 is configured for receiving a driving circuit board 200 (see in FIG. 2) therein. The top plate 113 defines a first opening 113a. The shape of the first opening 113a corresponds to that of a predetermined area of the driving circuit board 200 to be adhered to a reflector. The top plate 113 includes a number of blades 113b arranged around the opening 113a. The assembling base 11 further includes a positioning member 115 connected to the bottom plate 111. The positioning member 115 is configured for positioning the driving circuit board 200 in the receiving space 114. In this embodiment, the positioning member 115 is board-shaped and is connected to the bottom plate 111, the side plates 112, and the top plate 113 at a position closing a side of the opening 114. Alternatively, the positioning member 115 can instead be structured as one or more positioning poles.

The connecting unit 12 is fixedly connected to a top surface of the top plate 113 and is configured for slidably connecting the pressing portion 20 to the assembling base 11. The connecting unit 12 includes a supporting member 121 fixed on the top surface of the top plate 113 and a guiding member 122 connected to the supporting member 121. The supporting member 121 includes a number of supporting poles 121a and a supporting plate 121b. One end of the each pole 121a is fixed on the top plate 113, and the other end is connected to the supporting plate 121b. The supporting plate 121b defines a second opening 121c for the pressing portion 20 extending therethrough. The second opening 121c is aligned with the first opening 113a of the top plate 113, and the second opening 121c is no narrower than the first opening 113a. The guiding member 122 includes a guiding block 122a and two supporting posts 122b connected between the guiding block 122a and the top plate 113. The guiding block 122a defines a guiding hole 122c. The guiding hole 122c is configured for extension of the pressing portion 20 therethrough.

The pressing portion 20 includes a pressing plate 21, a guiding bar 22, and a pressing handle 23. The guiding bar 22 extends through the guiding hole 122c. The pressing plate 21 is connected to an end of the guiding bar 22 towards the bottom plate 111, and the pressing handle 23 is connected to the other end of the guiding bar 22. The shape and size of the pressing plate 21 are the same as that of the first opening 113a. The pressing plate 21 includes a pressing surface 211 for pressing a reflector 300 (see FIG. 3) to the driving circuit board 200. The pressing surface 211 is a finely machined surface. The pressing portion 20 further includes a spring member 24 configured for applying a spring force to the pressing plate 21 in a direction away from the bottom plate 111. In this embodiment, the spring member 24 is a helical spring and surrounds the guiding bar 22. The spring member 24 is compressed between the pressing handle 23 and the guiding block 122a. The pressing plate 21 is kept above the first opening 113a under the elastic force of the spring member 24.

Figure 2:
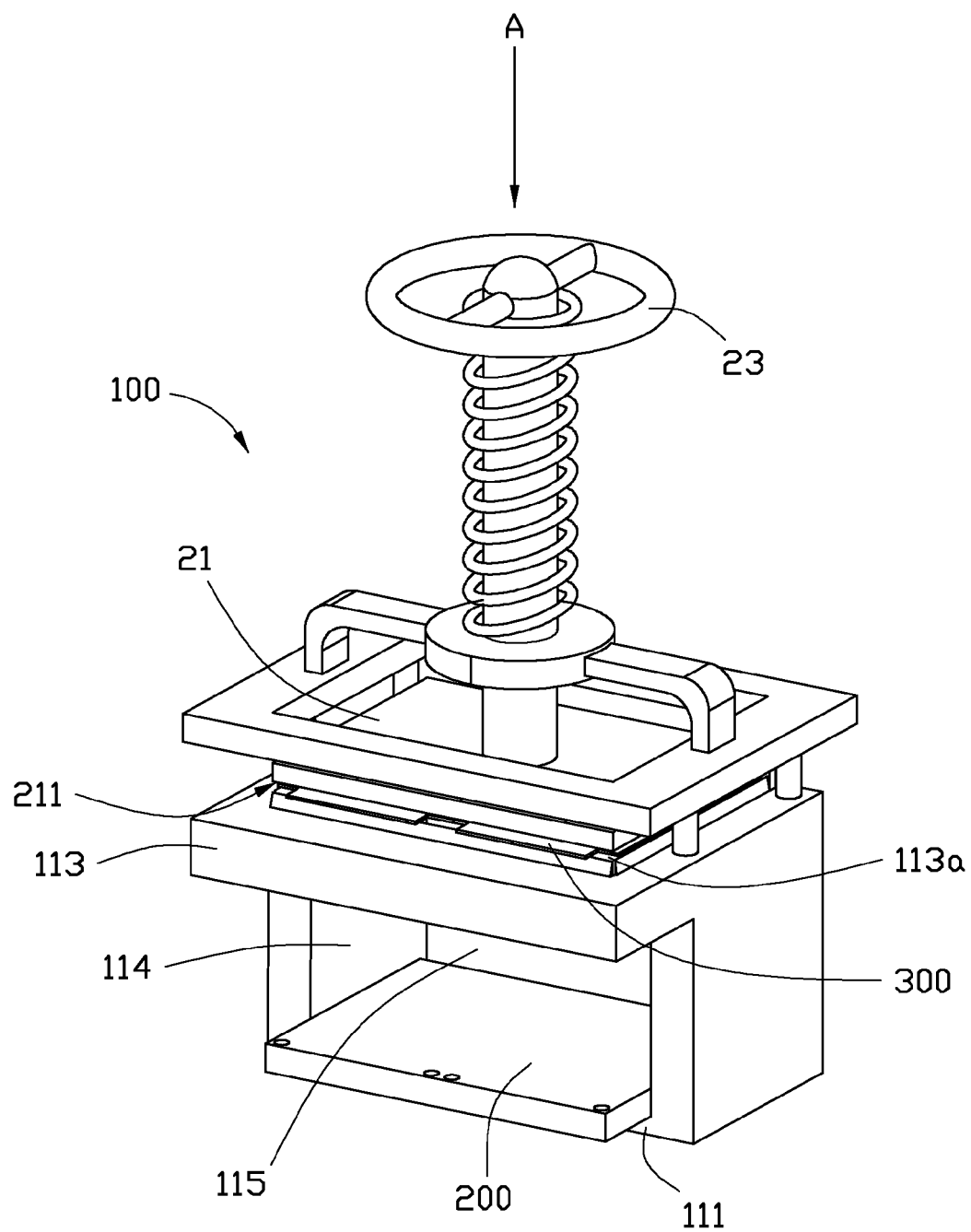
FIG. 2 is an isometric view of the backlight module assembling apparatus in a first operational state, together with a backlight module.
Figure 3:
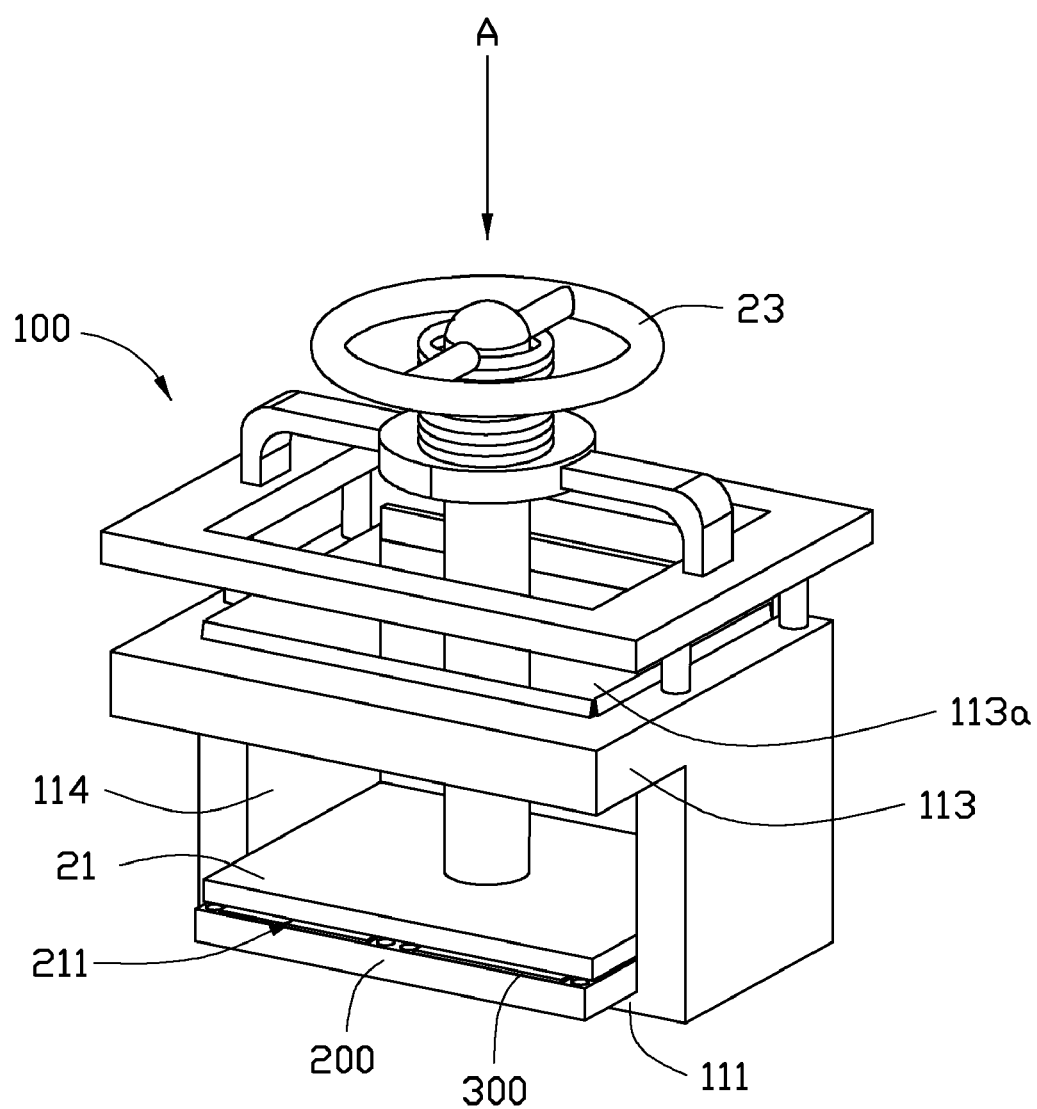
FIG. 3 is an isometric view of the backlight module assembling apparatus in a second operational state.

The backlight module assembling apparatus 100 is configured for assembling the reflector 300 to the driving circuit board 200. Referring to FIGS. 2-3, firstly, the driving circuit board 200 is received into the receiving space 114; then a side edge of the driving circuit board 200 is contacted to the positioning member 112. Secondly, the reflector 300 is expanded and fixed on the top surface of top plate 113 to cover the first opening 113a. The reflector 300 is structured as a thin film. A surface of the reflector 300 facing the bottom plate 111 is coated with adhesive (not shown). Then, the pressing handle 23 is pressed along a direction A, the pressing plate 21 moves close to the reflector 300, the pressing surface 211 presses on the top surface of the reflector 200, and the reflector 300 is cut out by the blades 113*b* under the pressing force of the pressing plate 21. Because the reflector 300 is a thin film and the pressing surface 211 is finely machined, the reflector 300 can be adsorbed on the pressing surface 211. And then, the reflector 300 is attached on the driving circuit board 200 under the pressing of the pressing plate 21. Because the pressing surface 211 is finely machined, the reflector 300 can be uniformly and flatly adhered on the driving circuit board 200, therefore, a good degree of light uniformity and brightness of the assembled backlight module can be achieved. Further, the assembling efficiency of the backlight module is enhanced.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A backlight module assembling apparatus for attaching a reflector plate to a driving circuit board, comprising:
    an assembling portion defining a receiving space configured for receiving and positioning a driving circuit board therein, the assembling portion comprising a top plate and a first opening defined in the top plate, the first opening communicating with the receiving space, the assembling portion comprising a plurality of blades arranged around the first opening for cutting a reflector plate; and
    a pressing portion movably connected to the assembling portion, the pressing portion comprising a pressing plate, the pressing plate being movable toward and away from the blade and configured for pressing the reflector plate against the blades thus allowing the blades cutting the reflector plate to a shape conforming to the first opening and attaching the reflector plate to the driving circuit board.

2. The backlight module assembling apparatus of claim 1, wherein the assembling portion comprises an assembling base having the receiving space and a connecting unit connected to the assembling base, the blades located between the assembling base and the connecting unit.

3. The backlight module assembling apparatus of claim 2, wherein the assembling base comprises a bottom plate, two side plates and the top plate, the bottom plate and the top plate are substantially parallel to each other, and the side plates are perpendicularly connected to the bottom plate and the top plate, the bottom plate, the side plates and the top plate cooperatively define the receiving space therebetween.

4. The backlight module assembling apparatus of claim 3, wherein the assembling base comprises a positioning member connected to the bottom plate configured for positioning the driving circuit board in the receiving space.

5. The backlight module assembling apparatus of claim 3, wherein the connecting unit comprises a supporting member fixed on the top plate and a guiding member connected to the supporting member.

6. The backlight module assembling apparatus of claim 5, wherein the supporting member comprises a number of supporting poles and a supporting plate, one end of the each pole is fixed on the top plate, and the other end is connected to the supporting plate.

7. The backlight module assembling apparatus of claim 6, wherein the supporting plate defines a second opening aligned with the first opening for the pressing portion extending therethrough.

8. The backlight module assembling apparatus of claim 5, wherein the guiding member comprises a guiding block and two supporting posts connected between the guiding block and the top plate, the guiding block defines a guiding hole for extension of the pressing portion therethrough.

9. The backlight module assembling apparatus of claim 8, wherein the pressing portion comprises a pressing plate, a guiding bar and a pressing handle, the guiding bar passes through the guiding hole, the pressing plate is connected to a first end of the guiding bar, and the pressing handle is connected to an opposite second end of the guiding bar.

10. The backlight module assembling apparatus of claim 9, wherein the pressing portion comprises a spring member configured for applying a spring force to the pressing plate in a direction away from the bottom plate.

11. The backlight module assembling apparatus of claim 10, wherein the spring member is a helical spring, the spring member surrounding the guiding bar, the spring member compressed between the pressing handle and the guiding block.

* * * * *